Figure 1:
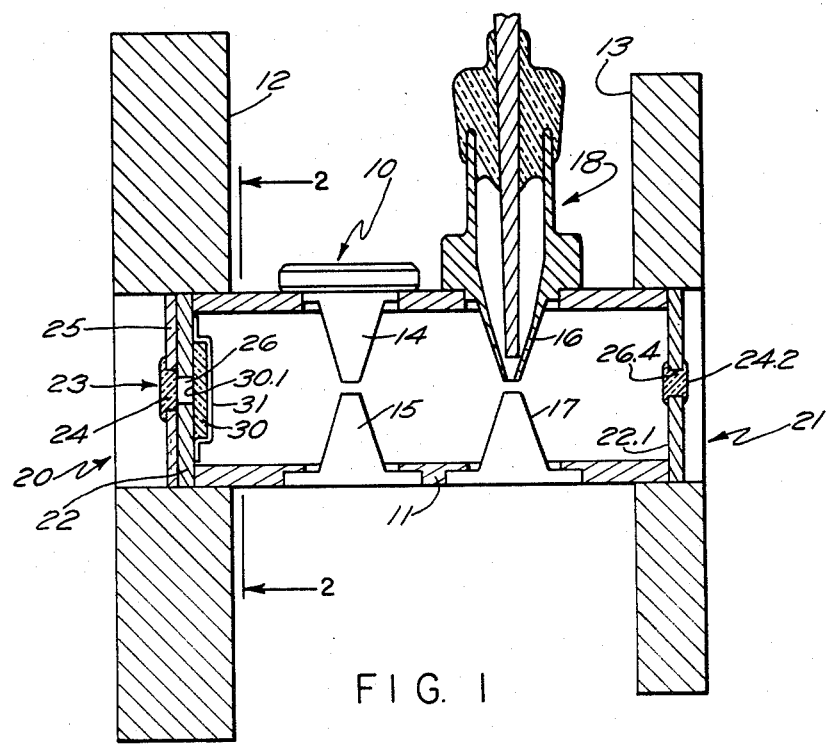

May 31, 1960 W. J. STANNEY ET AL 2,939,044
HIGH POWER FAST RECOVERY WAVEGUIDE WINDOWS
Filed June 11, 1959 3 Sheets-Sheet 1

INVENTORS
BASIL C. VAFIADES
WILLIAM J. STANNEY
BY
ATTORNEY

May 31, 1960  W. J. STANNEY ET AL  2,939,044
HIGH POWER FAST RECOVERY WAVEGUIDE WINDOWS
Filed June 11, 1959  3 Sheets-Sheet 2
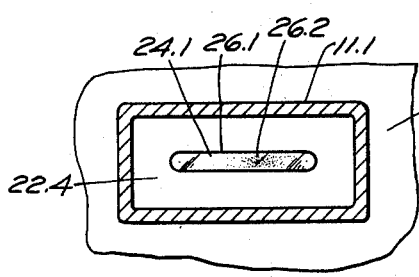
FIG. 3
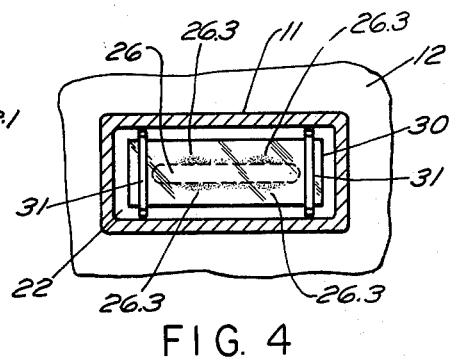
FIG. 4
FIG. 5
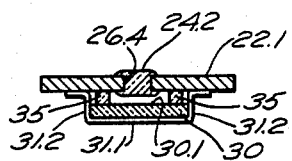
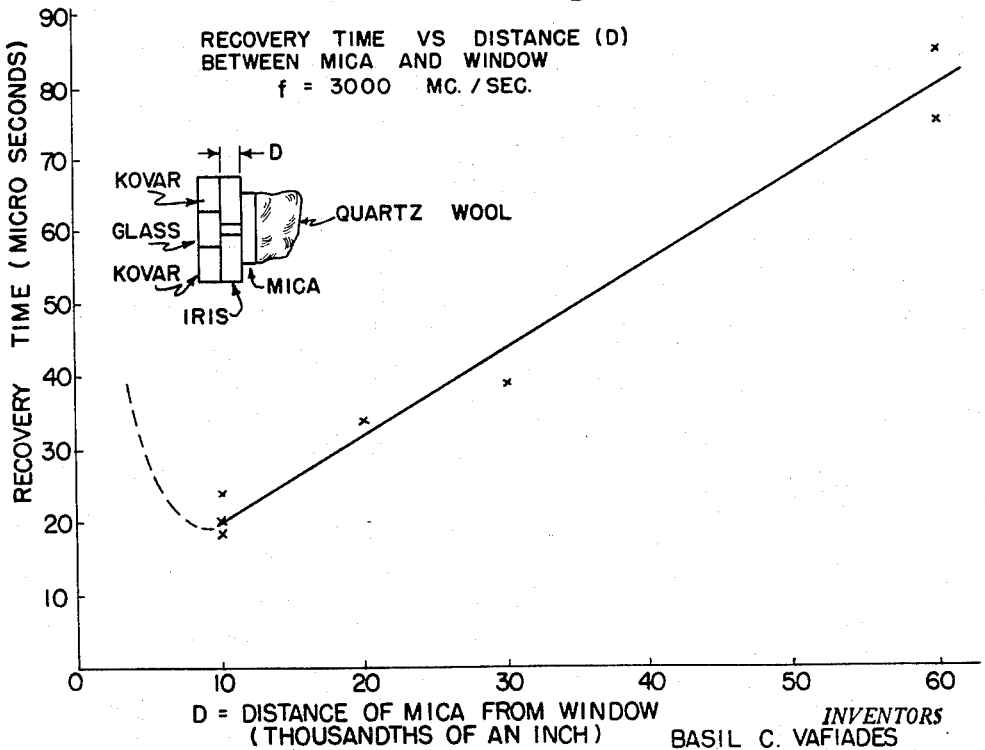
FIG. 6
INVENTORS
BASIL C. VAFIADES
WILLIAM J. STANNEY
BY
ATTORNEY

INVENTORS
BASIL C. VAFIADES
WILLIAM J. STANNEY
BY
ATTORNEY

United States Patent Office 2,939,044
Patented May 31, 1960

2,939,044

HIGH POWER FAST RECOVERY WAVEGUIDE WINDOWS

William J. Stanney, Needham, and Basil C. Vafiades, Waltham, Mass., assignors to Microwave Associates, Inc., Burlington, Mass., a corporation of Massachusetts Filed June 11, 1959, Ser. No. 819,717

24 Claims. (Cl. 315—39)

This invention relates in general to microwave transparent windows for waveguides, and more particularly to windows adapted for use in high power TR and Anti-TR tubes.

In the design of TR and Anti-TR tubes, it is necessary to achieve low recovery or gas deionization time and low leakage power for satisfactory operation. In order to achieve short recovery time or rapid gas deionization, it is customary to include a small amount of water or some other gas in the gas fill of the tube in order to capture the electrons after the transmitter (e.g. magnetron) power is removed. Although the tube recovery time is thereby brought within certain specified limits initially, the water in the tube is gradually driven off into the walls or combines with other elements in the tubes during operation, resulting in a depletion of the water vapor pressure and an increase in the recovery time. If additional water is added to the initial gas fill, high leakage power and arc loss result. As a consequence, the useful life of a TR or ATR tube is limited, insofar as the recovery time is concerned, by the amount of water which can be initially added to the gas fill of the tube.

In ATR tubes the use of water must be restricted in the initial gas fill because water increases the arc loss, thereby increasing the temperature of the tube window. This limitation on the use of water to reduce recovery time results in a relative increase in the difficulty of fabricating ATR tubes, which have satisfactory minimum recovery times.

As the level of operating power increases water is depleted at a faster rate and for this reason the expected life of TR and ATR tubes in operation at high power levels has been around 500 hours or less. Many TR and ATR tubes fail in from 200 to 400 hours when operated at high power levels.

The two most common solutions employed in the prior art to control the recovery time of the TR and ATR tubes are the use of sodium hydroxide pellets having absorbed water and the use of quartz wool pads, in the tubes. These techniques have both been found to be unsatisfactory for high power operation. The sodium hydroxide pellets, which hold absorbed water in the fashion of a reservoir for the life of the TR tube, and similar chemical reservoirs are temperature sensitive. Under high power operation the tube temperature increases resulting in higher values of water vapor pressure from the pellet, thereby causing higher flat power leakage, spike leakage energy, and greater power loss in the gas discharge (i.e., greater arc loss). These events combine at elevated temperatures to shorten tube life. The use of quartz wool, according to the teaching of Fiske Patent No. 2,496,865, results in excessive sputtering of iris window material on the glass part of the window, which shortens life by rapidly increasing the insertion loss of the tube, as will be explained below.

It is an object of the invention to provide a microwave transport window which reduces the recovery time of TR and ATR tubes to values below those heretofore available. It is another object of the invention to reduce sputtering on TR and ATR tube windows and thereby simultaneously increase the useful life of such tubes. Another object of the invention is to provide TR and ATR tubes which achieve reduced dissipative (i.e., insertion) loss. It is still another object of the invention to provide TR and ATR tubes of lower physical volume than has heretofore been available and having a lower breakdown power characteristic and a lower arc loss characteristic than have heretofore been possible. It is a further object of this invention to provide a window structure which can be precisely constructed to permit more exact measurement of the frequency characteristics of the window and thereby achieve tubes with more accurately predictable tuning characteristics. It is a still further object of the invention to provide a window structure which retains its low recovery time characteristics throughout a longer useful life than has heretofore been available thereby reducing the costs consequent upon short useful life and upon the necessity of frequent replacement of TR and ATR tubes. It is a general object of the invention to provide TR and ATR tubes capable of being operated at higher power levels and for longer useful life than tubes heretofore available.

The foregoing and other objects and features of this invention are achieved by providing a thin dielectric (e.g., mica) sheet closely adjacent the surface of the window iris which is inside a TR or ATR tube, precisely spaced a close distance from the dielectric sealed (e.g., ceramic or glass) portion of the window itself but not touching the sealed portion of the window. The thickness of the sheet when made of mica may be in the range of a few thousandths to a few ten thousandths of an inch, depending on the operating frequency. The distance of the sheet from the sealed portion of the window may be of the order of ten to twenty thousandths of an inch, and conveniently the iris element itself may be used as a spacer between the sheet and the dielectric window element. This dielectric sheet functions during a discharge across the iris to confine the discharge to the sheet itself, in a manner to be explained more fully below, thereby practically to eliminate sputtering on the sealed portion of the window for an extended period of high-power operation.

Figure 2:
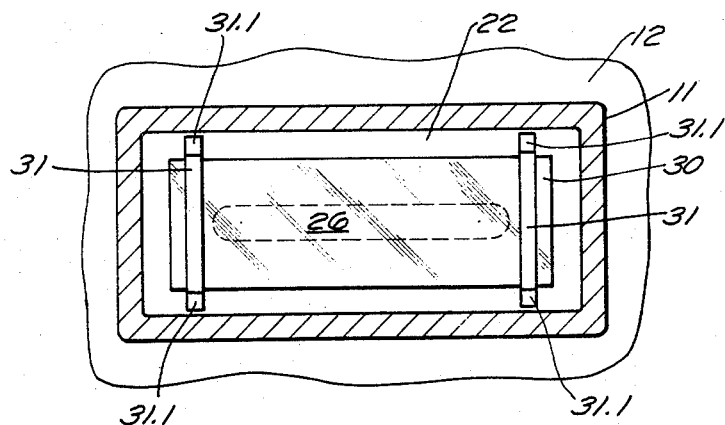
Figure 7:
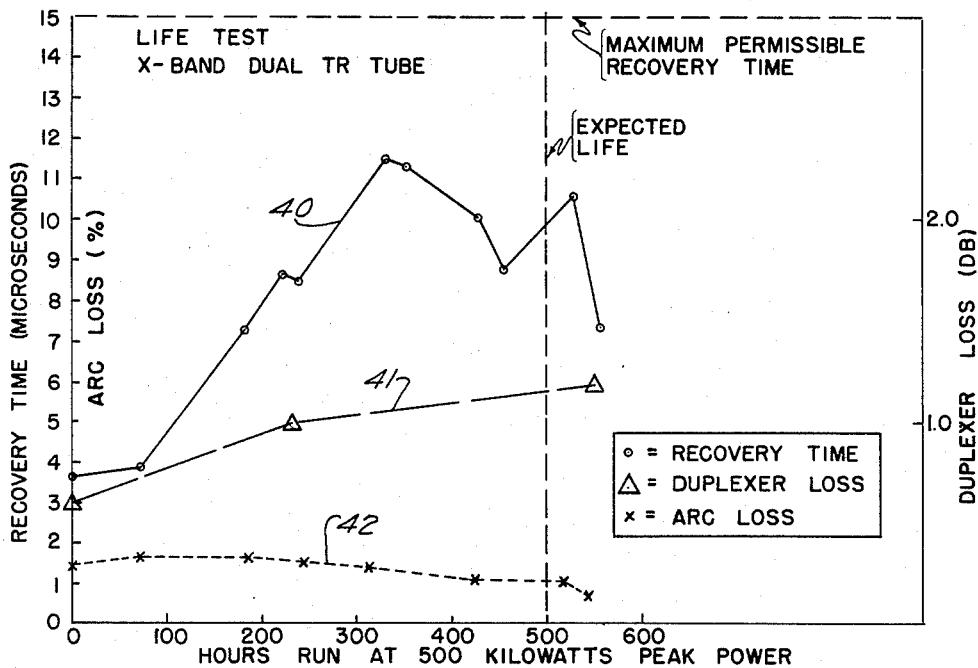
Figure 8:
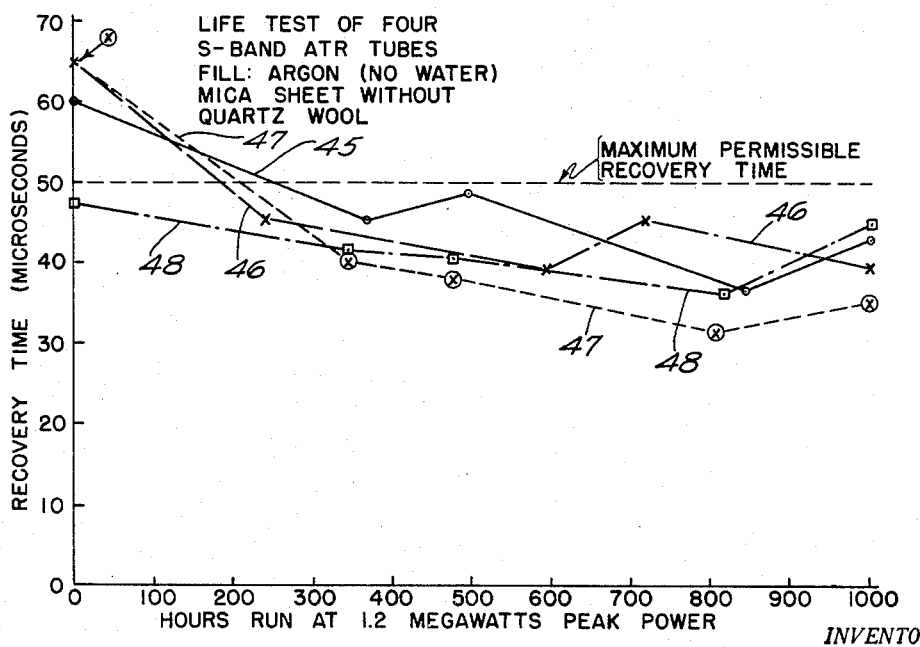

Other and further objects and features of the invention will become apparent from the following description of certain embodiments thereof and their operating characteristics. This description refers to the accompanying drawings wherein:

Fig. 1 illustrates in cross section a typical TR tube;
Fig. 2 is a view taken along line 2.2 of Fig. 1;
Fig. 3 is a view similar to Fig. 2 of a prior art window employing quartz wool, after a period of operation;
Fig. 4 is a view like Fig. 2 of a window according to the invention after a period of operation;
Fig. 5 illustrates in cross section another embodiment of the invention;
Fig. 6 is a graph illustrating the recovery time control characteristics of the invention at S-band;
Fig. 7 is a group of graphs illustrating properties of the invention and obtained upon life test of an X-band dual TR tube employing the invention; and
Fig. 8 is a group of four graphs illustrating the recovery time properties of the invention and obtained upon life test of four S-band ATR tubes employing the invention.

Referring now to Figs. 1 and 2, Fig. 1 illustrates a TR tube 10 having a rectangular waveguide portion 11 and flange members 12 and 13 of the kind typically employed for connecting a TR tube to other waveguide components. The waveguide is fitted with a first pair of spark gap elements 14 and 15 and a second pair of spark gap elements 16 and 17, and one element 16 of the second pair is fitted with a keep-alive structure 18, all of well-known construction, which are illustrated only to show the environment of the invention and will not be further desrcibed. An ionizable gas (not shown) fills the enclosed volume of this tube. The left-hand end 20 of the TR tube 10 as seen in Fig. 1 is the high power input end, whereas the right-hand end 21 of this structure is the low power or output end. Each end is fitted with an iris window structure. At the input end 20 this structure comprises an iris element 22 and a window element 23. The window element 23 further comprises a dielectric sealed window member 24 and a metallic frame member 25, the frame opening being larger than the opening 26 in the iris element 22. The structure comprising the iris and window elements 22 and 23 is of a kind described and claimed in the copending application of Richard M. Walker and William P. Toorks, Serial No. 657,585, filed May 7, 1957 and owned by the same assignee as the present invention. It is illustrated herein to show an appropriate environment for the invention, but it will be appreciated that the invention is applicable as well to other waveguide window constructions suitable for use in TR and ATR tubes. The iris window structure at the output end 21 comprises an iris element 22.1 having an iris opening 26.4 in which there is sealed a dielectric window element 24.2.

According to the invention, a sheet of dielectric material 30, which is preferably made of muscovite mica, is positioned a prescribed distance from the dielectric sealing window member 24. In the present embodiment this is accomplished by holding the sheet 30 closely adjacent the iris element 22, as by means of two straps 31 which traverse the iris element in regions which are beyond the iris opening 26 (Fig. 2). The straps 31 may be made of nickel, for example, and tack-welded at their ends 31.1 to the iris element 22. The iris element 22 itself may be made of stainless steel, when the iris and window structure is constructed according to the above-mentioned application of Walker and Toorks.

Referring now to Fig. 3, which as mentioned above is a view similar to that of Fig. 2, a waveguide 11.1 and fragment of a flange 12.1, similar to the waveguide and flange 11 and 12, respectively, of Fig. 1, are shown. Through the waveguide 11.1 may be seen an iris element 22.4, an iris opening 26.1, and a sealing glass window 24.1. Fig. 3 represents a TR tube constructed according to the aforementioned Fiske patent. In such a tube the quartz wool (not shown in Fig. 3) contained within the tube tends to confine an arc discharge across the iris element to the fibers of the quartz wool. It has been found that, due to the fact that the quartz wool fibers come in contact with the glass window 24.1, operation of such tubes at high power levels causes sputtering on the window as is illustrated by the dark shaded area 26.2, thereby reducing the useful life of the TR tube to at the most a few hundred hours, whereas (as mentioned above) the expected life of a TR tube is 500 hours or more. By contrast, windows constructed according to the present invention confine even high power arc discharges to the surface of the dielectric sheet 30 which confronts the iris opening, as is illustrated in Fig. 4.

Referring now to Fig. 4, which is identical to Fig. 2, the dielectric sheet 30, which in the embodiment of Figs. 1 and 2 touches the iris element 22, confines the arc discharge across the iris opening 26 to the surface (30.1 in Fig. 1) of the dielectric sheet immediately adjacent the iris opening 26, and the sputtering which eventually results occurs at the portion of that surface which is contiguous to the boundary of the iris opening 26, as is illustrated by the shaded areas 26.3 shown in Fig. 4. There is practically no sputtering on the surface 30.1 of the dielectric sheet 30 which confronts the iris opening 26 itself and, more important, no sputtering on the dielectric sealing (e.g., glass) window member 24. Figs. 3 and 4 were drawn from actual test samples of a prior art TR tube window, and a TR tube window constructed according to the present invention, respectively, which were operated at power levels of approximately 500 kw. peak power for times of approximately 100 hours for Fig. 3, and 500 hours for Fig. 4.

Fig. 5 illustrates another embodiment of the invention in which the dielectric sheet 30 is spaced from the iris element 22.1 by means of spacer elements 35. The straps 31.1 are made with slightly longer side arms 31.2 for this purpose. The spacer elements 35 may be electrically conductive or dielectric, as desired. The dielectric sheet 30 will continue to exercise its function of confining the arc discharge across the iris opening 26.4 to the surface 30.1 of the dielectric sheet which confronts the iris element 22.1. The window structure which is shown in Fig. 5 is constructed according to the prior art, in which the glass sealing window element 24.2 is held in the iris opening 26.4 and the iris element 22.1 is made of a suitable metal for sealing to glass, such as Kovar.

The recovery time of a window constructed according to the present invention is a function of the distance between the dielectric sheet 30 (i.e., mica or other discharge confining element) and the dielectric sealing window member 24, 24.2. Fig. 6 illustrates this function for a window constructed for use at S-band, namely, at a frequency of approximately 3000 mc./sec. This figure illustrates the recovery time in microseconds versus the distance D, for example, of a mica sheet from a window, in thousandths of an inch, for a structure such as that which is diagrammatically illustrated in the figure. In this structure a Kovar-glass window combined with a suitable iris element (employing the principles of the aforementioned application of Walker and Toorks) is combined with a mica sheet, the thickness of which may be of the order of a few thousandths of an inch. In the particular model which was tested quartz wool was included, on the side of the mica sheet away from the iris opening, but it was found that removal of the quartz wool had no effect upon the characteristics of the window structure illustrated. It will be noted that the recovery time was 20 microseconds at a distance of ten thousandths of an inch, and increased substantially lineally to approximately 80 microseconds for a distance of 60 thousandths of an inch.

It was found that in general as the distance D was decreased a point would be reached at which the recovery time increased, as indicated by the dashed line portion of the curve, at the left-hand end, in Fig. 6. This is believed to be due to the fact that the discharge, which is confined essentially to the surface of the mica sheet facing the iris opening, was brought so close to the dielectric sealing (e.g., glass) window member as in effect to yield again the adverse conditions present in prior art devices by coming in contact with the window, but we do not wish to be limited by any explanation of this observation.

In embodiments according to Fig. 1, the thickness of the iris element 22 establishes the distance D between the discharge-confining dielectric sheet 30 and the dielectric sealing window member 24. In embodiments according to Fig. 5, the spacer elements 35 establish the distance D.

Fig. 7 is a series of graphs illustrating the performance during life tests exceeding 500 hours of an X-band dual TR tube employing the present invention. The tube was operated at 500 kw. peak power. It employed a stainless steel iris and a mica sheet touching the iris. The dielectric sealing window and iris structure was according to the principles of the aforementioned Walker and Toorks application. Curve 40 shows the recovery time in microseconds as a function of operating life and it will be seen immediately that over a period exceeding 500 hours the recovery time never exceeded the maximum permissible recovery time (15 microseconds) for satisfactory X-band TR tubes, and that this condition continued for approximately 550 hours. Curve 41 shows the duplexer loss (in db), which remained in the vicinity of one db for approximately 550 hours. Curve 42 shows the arc loss in percent, which was low and substantially unchanged for the same period of time.

Fig. 8 illustrates the recovery time of four different S-band ATR tubes which were operated for one thousand hours each at 1.2 megawatts peak power. These tubes were each filled with argon; they contained no water. The window of each was fitted with a mica sheet as shown in Fig. 2, and there was no quartz wool in any of them.

Curve 45, which is drawn as a solid line, shows the recovery time of one of these tubes to have been initially 60 microseconds and then to have decreased within approximately 250 hours to values which thereafter remained below 50 microseconds. Curve 46, which is drawn as a series of long dashes, shows the recovery time of the second tube, which was initially about 65 microseconds, and reduced in less than 200 hours to values which thereafter remained below 50 microseconds. Curve 47, which is drawn as a series of short dashes, represents the recovery time of the third tube, which was initially about 65 microseconds and reduced in just a little over 200 hours to values which thereafter remained below 50 microseconds, reaching as low as approximately 32 microseconds after 800 hours of operation. Curve 48, which is drawn as a series of alternate short and long dashes, represents the recovery time of the fourth tube, which was consistently below 50 microseconds, for the entire life test period of one thousand hours.

Referring again to the fact that ATR tubes constructed according to the prior art are susceptible to a high reject rate because of the restriction on use of the prior-known means of reducing their recovery time (i.e., water in them), it will be appreciated immediately that ATR tubes constructed according to the present invention need not be rejected because initially they appear to have recovery times which exceed the maximum permissible recovery time. As is shown in Fig. 8 the maximum permissible recovery time for S-band ATR tubes is 50 microseconds, and of the four tubes whose characteristics are illustrated, three (3) which initially had recovery times below this value, after approximately 200 hours of operation and thereafter had useful recovery times for 800 hours each. While we do not wish to be limited by any explanation of this phenomenon, this is believed to be due to the fact that mica, especially muscovite mica, is composed of a large number of infinitesimally thick layers which are bonded together and that water is entrapped between these layers, so that approximately six percent of the mica by weight is water. This water cannot be driven out from between the layers of mica except by placing the mica in a furnace at a high temperature for a prolonged period of time. As a consequence it is believed that the mica sheet constitutes a reservoir of water which gives up its water slowly over a long period of time. In the case of TR tubes, this reservoir acts in a manner to replace water lost in the original window. In the case of ATR tubes this reservoir acts in a manner to supply water which could not be initially included in the gas fill for its obviously useful function, for the reason mentioned above. That is, if water were included in the original gas fill it would cause the ATR tube to operate at an excessively high temperature. The water entrapped in mica does not contribute to such heating, because the water is heated only when it is in the gas fill. Thus, the small amounts of water which are believed to be contributed by the mica sheet are too minute to cause a dangerous increase in the operating temperature of an ATR tube, but sufficient to afford the low recovery time benefits of water in such a device. It is believed to be for this reason that the presence of the mica sheet in the three tubes represented by the curves 45, 46, and 47 in Fig. 8 caused these tubes to achieve recovery times below 50 microseconds within a few hundred hours.

The advantages of the invention are many. It has been found that a thin mica sheet acts as a diffusion medium to reduce the recovery time in TR tubes and in ATR tubes without the use of quartz wool or excessive water. Consequently, the mica can be located closer to the input window than quartz wool without causing the kind of sputtering which is illustrated in Fig. 3, and this in turn results in a reduction of the recovery time. Furthermore, since the mica can be located more precisely than quartz wool, tubes constructed according to the present invention required less volume to achieve low recovery time, thereby reducing dissipative losses, breakdown power, and arc loss. In addition precise location of the mica makes possible more exact frequency measurements of window structures, thereby providing tubes with more accurately predictable tuning characteristics. Most of these improvements can be afforded when any dielectric element which has the characteristic of confining an electric discharge to one of its surfaces so that it can confine the discharge across the iris opening to a surface of the dielectric element and prevent the discharge from coming in contact with the sealing window element. The characteristics of mica which are believed to afford the additional advantage of a reservoir of water are, of course, peculiar to a material of a structure similar to that of mica. As is mentioned above, muscovite mica is preferred.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. Sealing window device for waveguide apparatus comprising a metallic iris element having an iris opening, a hermetically sealable element of electromagnetic wave pervious dielectric material sealing said opening, and a sheet-like element of electromagnetic wave pervious dielectric material located adjacent said opening, said sheet-like element having an area larger than the area of said iris opening, and being adapted to confine an electric discharge across said opening essentially to the surface of said sheet-like element which confronts said iris opening.

2. Device according to claim 1 in which a pair of straps fastened at their ends to said iris element and traversing peripheral regions of said iris element beyond the ends of said iris opening support said sheet-like element relative to said iris element.

3. Device according to claim 1 including spacer means on said iris element and in which said sheet-like element is in contact with said spacer means.

4. Sealing window device for waveguide apparatus comprising a metallic iris element having an iris opening, a hermetically sealable element of electromagnetic wave pervious dielectric material sealing said opening, and a sheet of mica located adjacent said opening, the area of said sheet being greater than the area of said opening.

5. Sealing window device for waveguide apparatus comprising a metallic iris element having an iris opening, a hermetically sealable element of electromagnetic wave pervious dielectric material covering one side of said iris opening and a portion of the surface of said iris element surrounding said opening at said one side, and a second sheet-like element of electromagnetic wave pervious dielectric material covering the opposite side of said iris opening, said second sheet-like element having an area larger than the area of said iris opening, and being adapted to confine an electric discharge across said iris opening essentially to the surface of said sheet-like element which confronts said iris opening.

6. Sealing window device for waveguide apparatus comprising a metallic iris element having an iris opening, a hermetically sealable element of electromagnetic wave pervious dielectric material covering one side of said iris opening and a portion of the surface of said iris element surrounding said opening at said one side, and a second sheet-like element of electromagnetic wave pervious dielectric material in contact with the other side of said iris element covering said iris opening, said second sheet-like element having an area larger than the area of said iris opening, and being adapted to confine an electric discharge across said iris opening essentially to the surface of said sheet-like element which confronts said iris opening.

7. Sealing window device for waveguide apparatus comprising a metallic iris element having an iris opening, a hermetically sealable element of electromagnetic wave pervious dielectric material covering one side of said iris opening and a portion of the surface of said iris element surrounding said opening at said one side, and a sheet of mica covering the other side of said iris opening, the area of said sheet being greater than the area of said opening.

8. Device according to claim 7 in which said sheet of mica is in contact with said iris element.

9. Device according to claim 8 in which a pair of straps fastened at their ends to said iris element and traversing peripheral regions of said other side of said iris element beyond the ends of said iris opening hold said sheet of mica in contact with said iris element.

10. Device according to claim 7 in which said hermetically sealable element is glass in contact with the material of said iris element surrounding said one side of said iris opening, and said sheet of mica is in contact with the material of said iris element surrounding said other side of said iris element.

11. Device according to claim 10 in which said iris element is made of steel.

12. Sealing window device for waveguide apparatus comprising a metallic iris element having an iris opening and made of a material which is essentially nonsputtering in the presence of an electric discharge across said iris opening, a hermetically sealable element of electromagnetic wave pervious dielectric material in contact with one side of said iris element covering said iris opening and a portion of the surface of said iris element surrounding said opening at said one side, and a second sheet-like element of electromagnetic wave pervious dielectric material positioned adjacent the opposite side of said iris element and covering said iris opening, the area of said sheet being greater than the area of said opening, said second sheet-like element being adapted to confine an electric discharge across said iris opening essentially to the surface of said sheet-like element which confronts said iris opening.

13. Sealing window device for waveguide apparatus comprising a metallic iris element having an iris opening, a hermetically sealable component comprising an element of electromagnetic wave pervious dielectric material sealed in a frame made of a metal which is hermetically sealable to said dielectric material, the opening of said frame being larger than said iris opening, said frame and iris element being hermetically sealed to each other in the region of their outer peripheries with said dielectric element covering one side of said iris opening and a portion of the surface of said iris element surrounding said opening at said one side, and a second sheet-like element of electromagnetic wave pervious dielectric material covering the opposite side of said iris opening, the area of said sheet being greater than the area of said opening, said second sheet-like element being adapted to confine an electric discharge across said iris opening essentially to the surface of said sheet-like element which confronts said iris opening.

14. Sealing window device for waveguide apparatus comprising a metallic iris element having an iris opening, a hermetically sealable component comprising an element of electromagnetic wave pervious dielectric material sealed in a frame made of a metal which is hermetically sealable to said dielectric material, the opening of said frame being larger than said iris opening, said frame and iris element being hermetically sealed to each other in the region of their outer peripheries with said dielectric element covering one side of said iris opening and a portion of the surface of said iris element surrounding said opening at said one side, said iris element being made of a material which is essentially nonsputtering in the presence of an electric discharge across said iris opening, and a second sheet-like element of electromagnetic wave pervious dielectric material covering the opposite side of said iris opening, the area of said sheet being greater than the area of said opening, said second sheet-like element being adapted to confine an electric discharge across said iris opening essentially to the surface of said sheet-like element which confronts said iris opening.

15. Sealing window device for waveguide apparatus comprising a metallic iris element having an iris opening, a hermetically sealable element of electromagnetic wave pervious dielectric material covering one side of said iris opening and a portion of the surface of said iris element surrounding said opening at said one side, and a second sheet-like element of electromagnetic wave pervious dielectric material adjacent the other side of said iris element covering said iris opening, the area of said sheet being greater than the area of said opening, a pair of straps fastened at their ends to said iris element and traversing peripheral regions of said other side of said iris opening, said straps holding said second sheet-like element in contact with said other side of said iris element, said second sheet-like element being adapted to confine an electric discharge across said iris opening essentially to the surface of said sheet-like element which confronts said iris opening.

16. An electric discharge device adapted to be used in high frequency electromagnetic wave systems comprising a cavity having an electrically conductive envelope, an iris element positioned in an opening in said envelope and providing an iris opening into said envelope for electromagnetic waves, an ionizable gas in said envelope to facilitate the formation of an electric discharge across said cavity by electromagnetic waves, and a sheet-like element of electromagnetic wave pervious dielectric material positioned within said envelope adjacent said iris opening adapted to confine a discharge across said iris substantially to the surface of said element confronting said iris opening, the area of said sheet being greater than the area of said opening.

17. An electric discharge device adapted to be used in high frequency electromagnetic wave systems comprising a cavity having an electrically conductive envelope, an iris element positioned in an opening in said envelope and providing an iris opening into said envelope for electromagnetic waves, an ionizable gas in said envelope to facilitate the formation of an electric discharge across said cavity by electromagnetic waves, a hermetically sealing element comprising electromagnetic wave pervious dielectric material hermetically sealing said iris opening, and a sheet-like element of electromagnetic wave pervious dielectric material positioned within said envelope adjacent the inner side of said iris opening and spaced a prescribed distance from said sealing element, said sheet-like element having an area larger than the area of said iris opening and being adapted to confine a discharge across said iris opening substantially to the surface of said sheet-like element confronting said iris opening.

18. An electric discharge device adapted to be used in high frequency electromagnetic wave systems comprising an electrically conductive envelope, an iris element positioned in an opening in said envelope and providing an iris opening into said envelope for electromagnetic waves, an ionizable gas in said envelope to facilitate the formation of an electric discharge across said cavity by electromagnetic waves, and a sheet of mica within said envelope positioned closely adjacent to and covering said iris opening, the area of said sheet being greater than the area of said opening.

19. An electric discharge device adapted to be used in high frequency electromagnetic wave systems comprising an electrically conductive envelope, an iris element positioned in an opening in said envelope and providing an iris opening into said envelope for electromagnetic waves, an ionizable gas in said envelope to facilitate the formation of an electric discharge across said cavity by electromagnetic waves, a hermetically sealing element comprising electromagnetic wave pervious dielectric material hermetically sealing said iris opening, and a sheet of mica within said envelope positioned closely adjacent to and covering said iris opening, the area of said sheet being greater than the area of said opening.

20. An electric discharge device adapted to be used in high frequency electromagnetic wave systems comprising discharge electrodes closely spaced to permit the formation of an electric discharge between them by electromagnetic waves, an ionizable gas filling the space between said electrodes to facilitate the passage of an electric discharge between them, an envelope surrounding said electrodes and containing said gas, an iris element positioned in an opening in said envelope and providing an iris opening into said envelope for electromagnetic waves which is adapted to be traversed by said discharge, and a sheet-like element of electromagnetic wave pervious dielectric material positioned within said envelope adjacent said iris opening adapted to confine the discharge across said iris substantially to the surface of said element confronting said iris opening, the area of said sheet being greater than the area of said opening.

21. An electric discharge device adapted to be used in high frequency electromagnetic wave systems comprising electrodes closely spaced to permit the formation of an electric discharge between them by electromagnetic waves, an ionizable gas filling the space between said electrodes to facilitate the passage of an electric discharge between them, an envelope surrounding said electrodes and containing said gas, an iris element positioned in an opening in said envelope and providing an iris opening into said envelope for electromagnetic waves which is adapted to be traversed by said discharge, a hermetically sealing element of electromagnetic wave pervious dielectric material sealing said opening, and a sheet-like element of electromagnetic wave pervious dielectric material positioned within said envelope adjacent said iris opening and spaced a prescribed distance from said sealing element, said sheet-like element having an area larger than the area of said iris opening, and being adapted to confine the discharge across said iris opening substantially to the surface of said sheet-like element confronting said iris opening.

22. An electric discharge device adapted to be used in high frequency electromagnetic wave systems comprising electrodes closely spaced to permit the formation of an electric discharge between them by electromagnetic waves, an ionizable gas filling the space between said electrodes to facilitate the passage of an electric discharge between them, an envelope surrounding said electrodes and containing said gas, an iris element positioned in an opening in said envelope and providing an iris opening into said envelope for electromagnetic waves which is adapted to be traversed by said discharge, a hermetically sealing element comprising electromagnetic wave pervious dielectric material positioned adjacent the side of said iris opening which is outside said envelope and hermetically sealing said envelope, and a sheet-like element of electromagnetic wave pervious dielectric material positioned within said envelope adjacent the other side of said iris opening adapted to confine the discharge across said iris substantially to the surface of said sheet-like element confronting said iris opening, the area of said sheet being greater than the area of said opening.

23. An electric discharge device adapted to be used in high frequency electromagnetic wave systems comprising electrodes closely spaced to permit the formation of an electric discharge between them by electromagnetic waves, an ionizable gas filling the space between said electrodes to facilitate the passage of an electric discharge between them, an envelope surrounding said electrodes and containing said gas, an iris element positioned in an opening in said envelope and providing an iris opening into said envelope for electromagnetic waves which is adapted to be traversed by said discharge, and a sheet of mica within said envelope positioned closely adjacent to and covering said iris opening, the area of said sheet being greater than the area of said opening.

24. An electric discharge device adapted to be used in high frequency electromagnetic wave systems comprising electrodes closely spaced to permit the formation of an electric discharge between them by electromagnetic waves, an ionizable gas filling the space between said electrodes to facilitate the passage of an electric discharge between them, an envelope surrounding said electrodes and containing said gas, an iris element positioned in an opening in said envelope and providing an iris opening into said envelope for electromagnetic waves which is adapted to be traversed by said discharge, a hermetically sealing element comprising electromagnetic wave pervious dielectric material positioned adjacent the side of said iris opening which is outside said envelope and hermetically sealing said envelope, and a sheet of mica within said envelope positioned closely adjacent to and covering said iris opening, the area of said sheet being greater than the area of said opening.

References Cited in the file of this patent

UNITED STATES PATENTS

| | | |
|---|---|---|
| 2,496,865 | Fiske | Feb. 7, 1950 |
| 2,533,512 | Samuel | Dec. 12, 1950 |
| 2,556,881 | McArthur | June 12, 1951 |
| 2,646,550 | Varela | July 21, 1953 |
| 2,866,130 | Ghen | Dec. 23, 1958 |